United States Patent

O'Connor et al.

[15] 3,703,835
[45] Nov. 28, 1972

[54] MEANS FOR TAKING UP SLACK IN LEAD SCREW DEVICES

[72] Inventors: Charles A. O'Connor, 100 Sunnyhill Drive, E. Norwich; Richard J. Maehr, 4 Chelsea Place, Huntington, both of N.Y.

[22] Filed: Aug. 27, 1970

[21] Appl. No.: 67,484

[52] U.S. Cl. ................................74/441, 90/22
[51] Int. Cl. ......................................F16h 55/18
[58] Field of Search ........................90/22; 74/441

[56] References Cited

UNITED STATES PATENTS

| | | | |
|---|---|---|---|
| 2,679,168 | 5/1954 | Rokos | 74/441 |
| 1,707,442 | 4/1929 | Maag | 74/441 |
| 2,385,194 | 9/1945 | Carroll | 74/441 |
| 3,119,307 | 1/1964 | Opferkuch | 90/22 |

Primary Examiner—Andrew R. Juhasz
Assistant Examiner—Z. R. Bilinsky
Attorney—Albert F. Kronman

[57] ABSTRACT

A spaced double nut combination mounted upon a lead screw and coupled to a movable table for reducing the nut backlash to zero. The two nuts are rotatably linked to each other by a spring loaded rockable yoke. The yoke acts to move the nuts to eliminate backlash on the lead screw. Binding action between the nut combination and the lead screw is prevented by the differential frictional contact between the nuts and the screw.

9 Claims, 6 Drawing Figures

INVENTORS
CHARLES A. O'CONNOR
RICHARD J. MAEHR
BY
Albert H. Kronman
ATTORNEY

INVENTORS
CHARLES A. O'CONNOR
RICHARD J. MAEHR

ATTORNEY

MEANS FOR TAKING UP SLACK IN LEAD SCREW DEVICES

BACKGROUND OF THE INVENTION

Many instruments of precision require the use of a lead screw to drive a movable table or stage. For example, a screw cutting lathe, a microscope stage, and a layout table all use a calibrated lead screw meshing with a nut secured to a table or tool post. In the past, considerable backlash or play developed in the mechanism as a result of wear, and the operator who controlled the machine could produce precision work only when turning the lead screw in one direction. Sometimes, a strong spring was coupled between the movable stage and the lead screw support. The spring absorbed the backlash but the load on the lead screw was unbalanced; that is, more force is necessary to move the table in one direction than in the other. Many other schemes have been proposed but they either unbalance the coupling, cause a binding action, or do not entirely eliminate the slack motion.

The present invention eliminates slack motion entirely, does not bind, and is balanced so that the forces necessary to move the table in either direction are equal.

DESCRIPTION OF THE PREFERRED EMBODIMENT

Figure 1:
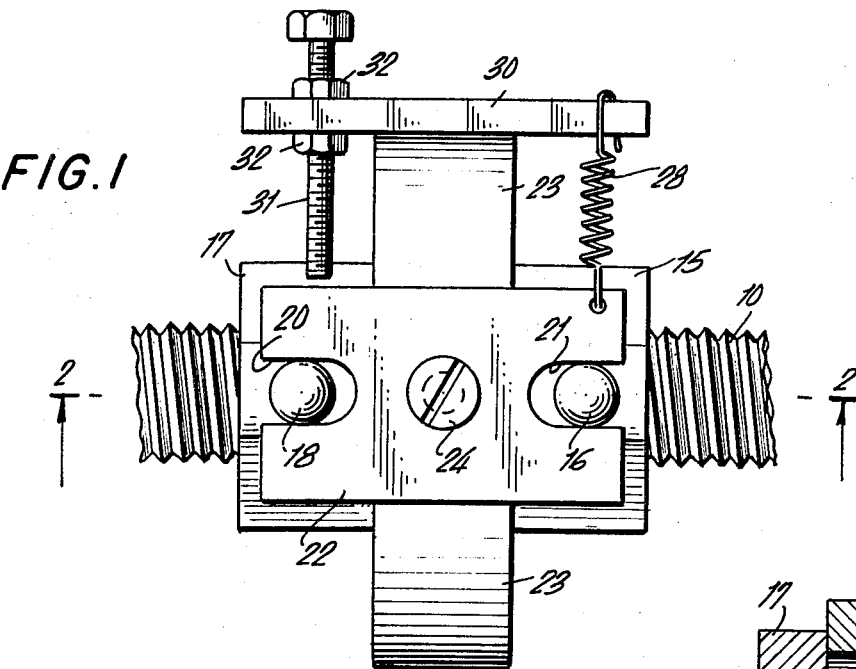
FIG. 1 is plan view of one embodiment of the device showing the lead screw, the two nuts, and the yoke which couples the nuts to each other.
Figure 3:
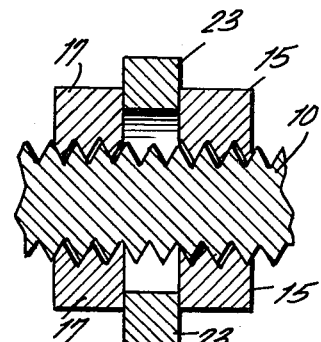
FIG. 3 is a diagrammatic view of the two nuts, the lead screw, and a supporting member to illustrate the operation of the device.
Figure 2:
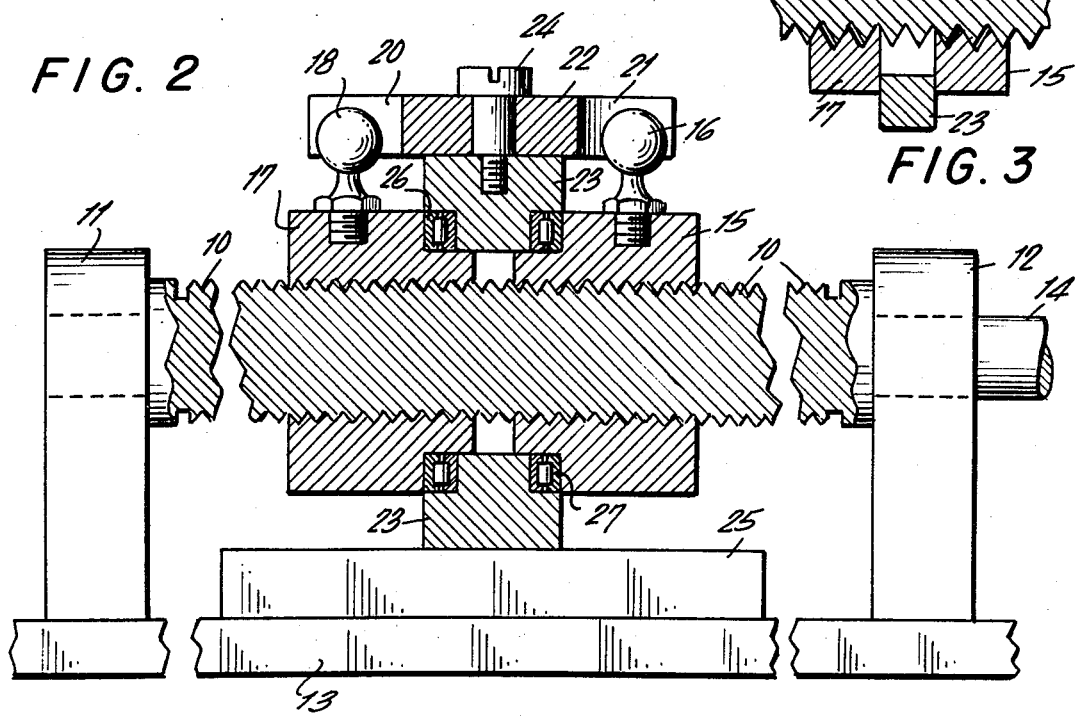
FIG. 2 is a cross sectional view of the device shown in FIG. 1 and is taken along line 2—2 of that figure. This figure also shows the base and the lead screw supports.

Referring now to FIGS. 1-3, the lead screw 10 is supported by two bearing members 11, 12, secured to a base 13. The lead screw 10 is turned by a shaft extension 14 which extends through bearing 12. A first nut 15 is received upon the external threads formed on the lead screw 10 and supports a first outwardly extending ball stud 16. A second nut 17 is also received upon the lead screw 10 and supports a second ball stud 18. The ball portions of studs 16 and 18 fit into two slots 20 and 21 cut into a swingable yoke 22. The yoke 22 is pivotally mounted on a laterally movable transport member 23. The transport member 23 is secured to a movable table 25 which slides along the upper surface of the base 13 when the lead screw 10 is turned. It is understood that the movable table or stage 25 may be positioned on the opposite side of the lead screw 10 and is not required to make contact with the base plate 13.

The two nuts 15 and 17 are positioned on the lead screw 10 so that they make contact with two thrust bearings 26 and 27. The fixed sides of the bearings 26, 27, are secured to the transport member 23. Bearings 26 and 27 are employed only to reduce friction, and may be omitted if desired. If the roller bearings are not used, the sides of nuts 15 and 17 will bear against opposite faces of transport member 23 and thereby apply the forces necessary to move table 25 when the lead screw is operated.

In order to tighten the nuts 15 and 17 on the lead screw 10 to take up any play, a spring 28 is attached at one end to one end of a cross bar 30 which in turn is secured to the transport member 23. The opposite end of the spring is attached to the yoke 22. The spring operates to turn the yoke in a counter clockwise manner as seen in FIG. 1. This action will turn nuts 15 and 17 in opposite directions to bring them toward each other and against the roller bearings 26 and 27.

FIG. 3, (not drawn to scale) illustrates the general action of the two nuts 15, 17, the lead screw 10 and the member 23. In this view, spaces have been left between threads of the nuts and the thread of the lead screw to indicate where contact remains when the two nuts 15, 17, are pulled tight against the bearings or the transport member 23. It is obvious from this view that there is no play between the lead screw and the transport member 23 when the device is stationary.

If the operator now turns the lead screw 10 to move the nuts to the right (assuming a right hand thread) there can be no binding action between the screw and the nuts, because the friction between the lead screw and nut 17 will be greater than the friction between the lead screw and nut 15 due to the resistance to movement on transport member 23 and the table 25. This greater friction on nut 17 will cause it and yoke 22 to tend to rotate clockwise which in turn tends to back off nut 15.

Under normal loads, spring 28 is strong enough to resist the rotation on yoke 22 and no backlash developes.

This same action occurs, but with nut 17 tending to back off when the lead screw is turned in the opposite direction.

If there were not limit on the rockable yoke 22, it might turn far enough to release one or both of the ball studs from their slots 20 or 21 under conditions of high inertia loads or heavy machining forces. To prevent this from occurring, an adjustable stop 31 is secured to cross bar 30 and positioned so that its end acts as a limit to the yoke 22. The adjustable stop 31 may be a screw held in place by nuts 32 or any other type of limit means. The stop 31 also prevents turning of the nuts 15, 17 an excessive amount in case one of the nuts is inclined to open too far under gross overload conditions.

Figure 5:
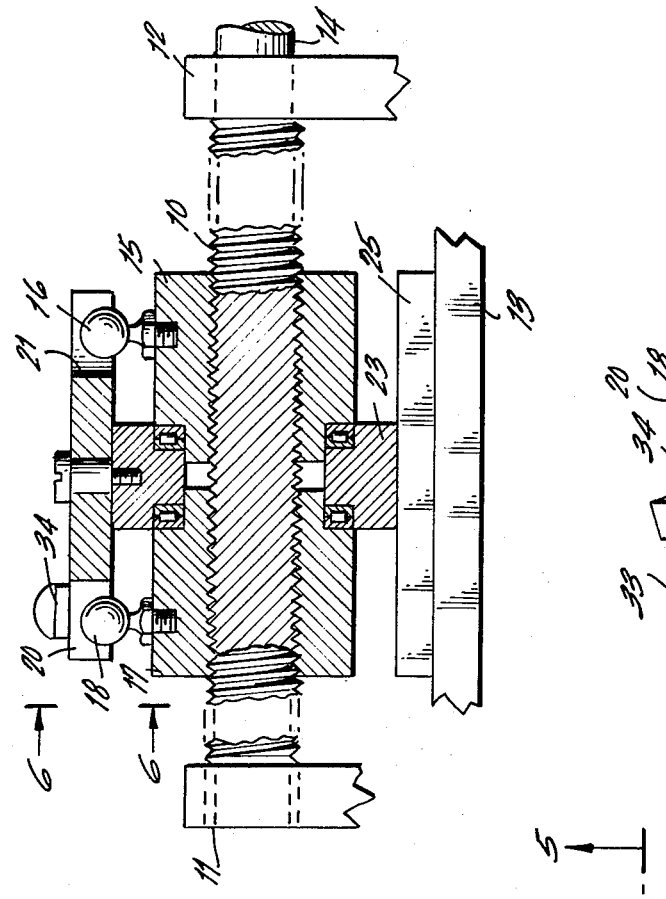
FIG. 5 is a cross sectional view taken on line 5—5 in FIG. 4.
Figure 6:
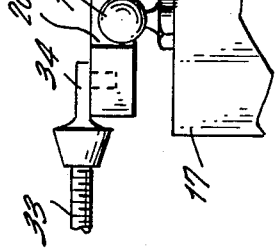
FIG. 6 is a view taken on line 6—6 of in FIG. 5, looking in the direction of the arrows.
Figure 4:
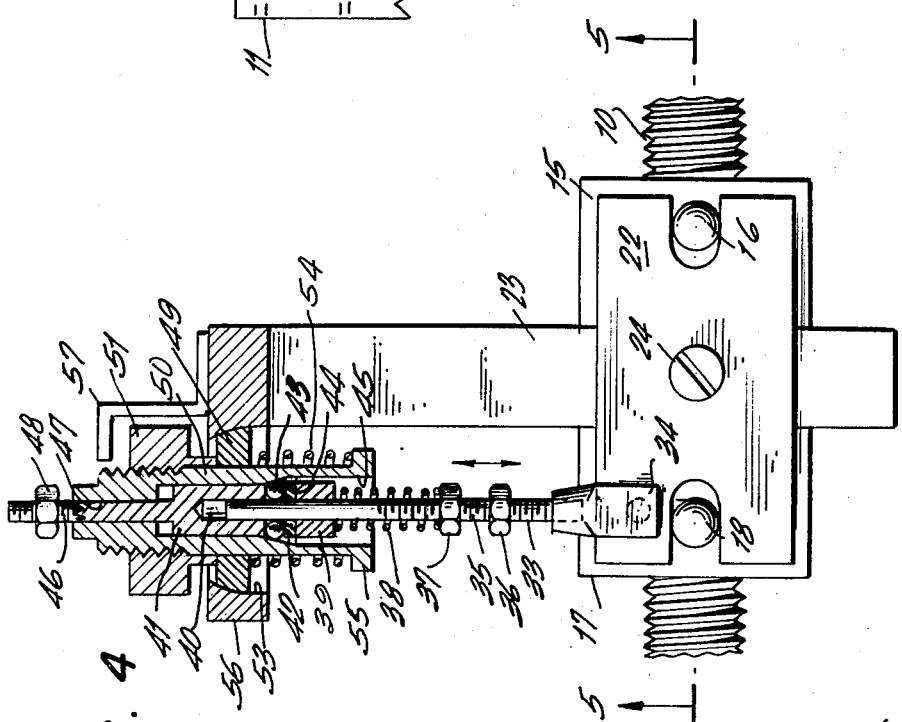
FIG. 4 is a top plan view, partly in section of another embodiment of the present invention.

Referring to FIGS. 4–6, there is shown another embodiment of the invention in which the yoke 22 is controlled by a spring loaded rod 33. The rod 33 is swingably coupled to the yoke 22 by means of a fitting 34 into which it is threaded.

The threads 35 on the rod 33 also serve to adjustably carry two nuts 36, 37. Nut 36 acts to lock nut 37 in position and nut 37 supports and loads one end of a coil spring 38 disposed around the rod 33.

A collar 39 is freely carried by the rod 33 and bears against the top of the spring 38. The rod 33 extends through the collar 39 and into a bore 40 of a slidable block 41. A resilient washer 42 of natural or synthetic rubber is carried upon the rod 33 above the collar 39 and a plurality of small steel balls 43 are disposed between the washer 42 and the block 41.

The steel balls 43 are retained in frictional contact with the rod 33 by the tapered portion 44 of the bore 45 in a sleeve 50. The upper portion of the bore 45 is cylindrical and slideably receives the block 41. A small guide rod 46 extends from the top of the block 41 through an axial bore 47 in the sleeve 50. The end of the guide rod 46 is threaded to receive a nut 48.

An adjusting nut 51 is threaded upon the sleeve 50 and bears against a disc 49. The disc 49 is freely carried upon the sleeve 50 and is provided with an arcuate peripheral surface 52 which is freely received within a complimentary socket 53 formed in an arm 56.

A coil spring member 54 is compressed between a flange 55 on the sleeve and the inner surface of the disc 49. The load on the coil spring 54 exceeds the force of the coil spring 38 around the rod 33. In this manner, the coil spring 38 will normally keep the nuts 15, 17, in contact with the member 23 to prevent backlash. However, in the event of overload, the rod would be forced outwardly against the coil spring 38 were it not for the locking action of the balls 43 in the tapered bore 44. The spring 54 thereupon serves to absorb and reduce any tendency of the rod 33 to compress the spring 38.

The entire spring loaded rod assembly is held by the arm 56 extending laterally from the transport member 23. A small bracket 57 secured to the arm 56 serves as a stop to prevent excessive outward motion of the nut 51 and consequently the rod 33 in the event of an overload which might overcome the force of the coil spring 54.

The operation of the embodiment shown in FIGS. 4–6 is much the same as that described in connection with FIGS. 1–3. Assuming the lead screw to be turning clockwise, the spring 38 will urge the yoke 22 in a counter clockwise direction causing the nuts 15, 17 to assume the position shown in FIG. 3 and taking up any backlash. Fluctuations in the lead screw such as worn and unworn portions will be compensated for by motion imparted to the yoke as the nuts 15, 17 run along the lead screw threads.

If the direction of the lead screw 10 is reversed, the nuts 15, 17 will be loaded in the opposite direction and once again take up any backlash in the assembly.

Having thus fully described the invention, what is claimed as new and desired to be secured by Letters Patents of the United States, is:

1. A back lash take up device for a lead screw driven apparatus comprising a rotatable lead screw, a first and a second nut threaded upon said lead screw in spaced relationship, a laterally movable member adjacent the lead screw disposed between the first and second nuts in lateral contact therewith, a swingable yoke carried by the movable member and positively coupled to each of said nuts and spring means to swing the yoke whereby the first and second nuts are rotated and urged against the movable member.

2. A device according to claim 1 in which each of said first and second nuts is provided with outwardly extending studs and the yoke is slotted to receive the said studs therein.

3. A device according to claim 1 in which the laterally movable member is ring shaped and surrounds the lead screw.

4. A device according to claim 1 in which thrust bearings are disposed between the movable member and the first and second nuts.

5. A device according to claim 1 in which the swing of the yoke is limited by a stop carried by the laterally movable member.

6. A device according to claim 1 in which the spring means is a coil spring under tension between the yoke and the movable member.

7. A device according to claim 1 in which the spring means is a spring loaded rod assembly yieldably coupled at one end to the yoke and at its other end to the movable member.

8. A device according to claim 7 in which the spring loaded rod assembly comprises an elongated rod, a fitting carried by the rod and freely coupled to the yoke, a one way clutch means carried by the rod spaced from the fitting, a first coil spring under compression disposed around the rod between the fitting and clutch means, a sleeve overlying a portion of the free end of the rod and the clutch means, an arm carried by the movable member and adapted to freely receive the sleeve therethrough and a second coil spring under compression disposed around the sleeve and supported between the sleeve and the arm member.

9. A device according to claim 8 in which the sleeve is rockably and freely supported by a plate carried by the arm.

* * * * *